United States Patent
Oyama (10) Patent No.: US 9,738,314 B2
(45) Date of Patent: Aug. 22, 2017

(54) TRAVEL CONTROL APPARATUS FOR VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/065,469

(22) Filed: Mar. 9, 2016

(65) Prior Publication Data

US 2016/0280262 A1    Sep. 29, 2016

(30) Foreign Application Priority Data

Mar. 23, 2015    (JP) .................................. 2015-059511

(51) Int. Cl.
*B62D 15/02* (2006.01)
*B62D 5/04* (2006.01)
(Continued)

(52) U.S. Cl.
CPC ............. *B62D 15/025* (2013.01); *G05D 1/00* (2013.01); *G05D 1/02* (2013.01); *B62D 11/00* (2013.01); *B62D 15/02* (2013.01); *G01C 21/34* (2013.01)

(58) Field of Classification Search
CPC ........... G05D 1/00; B62D 11/00; B62D 15/02
(Continued)

(56) References Cited

U.S. PATENT DOCUMENTS 5,925,082 A * 7/1999 Shimizu .................... B62D 1/28
                                                                180/272
8,126,642 B2 * 2/2012 Trepagnier ............ G01S 17/023
                                                                180/167
(Continued)

FOREIGN PATENT DOCUMENTS

JP    2005-067484 A    3/2005
JP    2010-102435 A    5/2010
(Continued)

OTHER PUBLICATIONS

Decision to Grant issued in corresponding Japanese Patent Application No. 2015-059511, dated Jan. 31, 2017.
(Continued)

*Primary Examiner* — Thomas G Black
*Assistant Examiner* — Wae Louie
(74) *Attorney, Agent, or Firm* — McDermott Will & Emery LLP (57) ABSTRACT

A travel control apparatus for a vehicle includes: a map information storage unit that stores map information; a vehicle position information obtaining unit that obtains position information indicating a position of the vehicle; a traveling road information obtaining unit that obtains traveling road information relating to a traveling road of the vehicle on the basis of the map information and the position information of the vehicle; a target traveling route setting unit that sets a target traveling route of the vehicle on the basis of the traveling road information of the vehicle; a vehicle traveling route estimating unit that estimates an traveling route of the vehicle on the basis of motion information relating to the vehicle; and a controller that performs control so as to reduce a deviation between the target traveling route of the vehicle and the estimated traveling route of the vehicle on the basis of the deviation.

4 Claims, 5 Drawing Sheets

(51) Int. Cl.
*G01C 21/34* (2006.01)
*G05D 1/02* (2006.01)
*G05D 1/00* (2006.01)
*B62D 11/00* (2006.01)

(58) Field of Classification Search
USPC .......................... 701/23, 25, 41, 50; 180/167
See application file for complete search history.

(56) References Cited

U.S. PATENT DOCUMENTS

| | | | | |
|---|---|---|---|---|
| 2010/0100284 A1* | 4/2010 | Kudo | ................... | B62D 15/025 |
| | | | | 701/42 |
| 2015/0346724 A1* | 12/2015 | Jones | ................... | B60W 30/12 |
| | | | | 701/23 |
| 2016/0114811 A1* | 4/2016 | Matsuno | ........... | B60W 50/0225 |
| | | | | 701/23 |
| 2016/0121906 A1* | 5/2016 | Matsuno | ................ | B60K 28/10 |
| | | | | 701/23 |
| 2016/0132055 A1* | 5/2016 | Matsuno | ............... | B60W 50/10 |
| | | | | 701/23 |
| 2016/0259335 A1* | 9/2016 | Oyama | ................ | G05D 1/0077 |
| 2016/0280262 A1* | 9/2016 | Oyama | ................ | B62D 15/025 |
| 2016/0362113 A1* | 12/2016 | Takaso | ................. | B60W 10/18 |
| 2017/0072963 A1* | 3/2017 | Matsuno | ......... | B60W 30/18172 |

FOREIGN PATENT DOCUMENTS

| | | |
|---|---|---|
| JP | 2010-102436 A | 5/2010 |
| JP | 2013-097714 A | 5/2013 |
| JP | 2013-159246 A | 8/2013 |

OTHER PUBLICATIONS

Notification of Reasons for Refusal Japanese Patent Application No. 2015-059511 dated Jul. 5, 2016 with English translation.

* cited by examiner

TRAVEL CONTROL APPARATUS FOR VEHICLE

CROSS-REFERENCE TO RELATED APPLICATIONS

The present application claims priority from Japanese Patent Application No. 2015-059511, filed on Mar. 23, 2015, the entire contents of which are hereby incorporated by reference.

BACKGROUND

1. Technical Field

The present invention relates to a travel control apparatus for a vehicle, which performs travel control along a target traveling route.

2. Related Art

Recently, various apparatuses employing automatic driving techniques that enable a driver to drive a vehicle in increased comfort and more safely have been developed and proposed. Japanese Unexamined Patent Application Publication (JP-A) No. 2013-97714, for example, discloses a technique employed in a lane keep control apparatus that performs lane keep control. According to this technique, a lane width of a lane recognized from an image obtained by an in-vehicle camera is compared with a lane width of a lane in which a vehicle is traveling, obtained from map information, whereupon a determination is made as to whether the lane recognized from the image has been recognized erroneously. When it is determined that the lane recognized from the image has been recognized erroneously, a side on which a lane division line has been recognized erroneously is determined using a lateral position of a preceding vehicle recognized from an image obtained by a camera that captures images frontward of the vehicle, and a target lateral position required to keep the vehicle in the lane is corrected in accordance with the determination result.

SUMMARY OF THE INVENTION

However, with the lane keep control apparatus disclosed in JP-A No. 2013-97714, it is impossible to determine the lane division line in respect of which correction should be made in a case where no lane division lines whatsoever can be recognized by the camera on the road due to snow or the like. Accordingly, true positions of the lane division lines cannot be obtained, and as a result, the lane keep control cannot be executed. In response to this problem, the lane keep control may be executed along a traveling road on a map on the basis of map information and vehicle position information, but when control amounts to be applied to the vehicle are set simply on the basis of the map information, the lane keep control cannot be performed with a sufficient degree of precision, and therefore the lane keep control apparatus lacks reliability.

It is desirable to provide a highly reliable travel control apparatus for a vehicle, which is capable of performing lane keep control with a high degree of precision on the basis of map information and vehicle position information even in a case where lane division lines cannot be recognized.

A travel control apparatus for a vehicle according to an aspect of the present invention includes a map information storage unit that stores map information, a vehicle position information obtaining unit that obtains position information indicating a position of a vehicle, a traveling road information obtaining unit that obtains traveling road information relating to a traveling road of the vehicle on the basis of the map information and the position information of the vehicle, a target traveling route setting unit that sets a target traveling route of the vehicle on the basis of the traveling road information of the vehicle, a vehicle traveling route estimating unit that estimates an traveling route of the vehicle on the basis of motion information relating to the vehicle, and a controller that performs control so as to reduce a deviation between the target traveling route of the vehicle and the estimated traveling route of the vehicle on the basis of the deviation.

DETAILED DESCRIPTION

An implementation of the present invention will be described below on the basis of the drawings.

Figure 1:
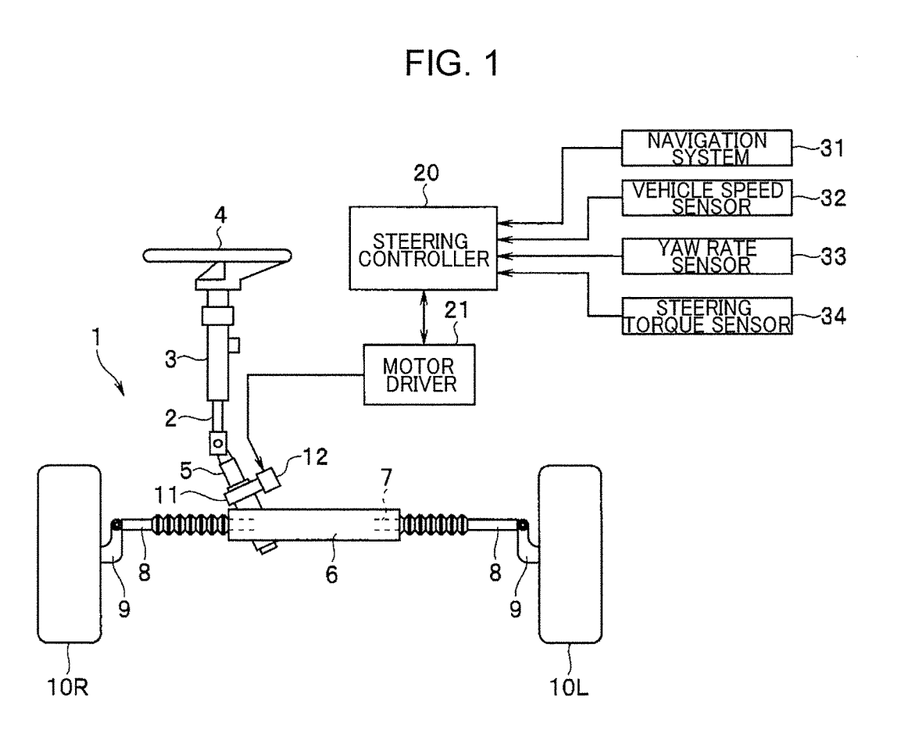
FIG. 1 is illustrates a configuration of a steering system of a vehicle according to an implementation of the present invention.

FIG. 1 is illustrates a configuration of a steering system of a vehicle according to an implementation of the present invention. In FIG. 1, a reference numeral 1 denotes an electric power steering device capable of setting a steering angle freely, independently of driver input. In the electric power steering device 1, a steering shaft 2 is supported on a vehicle body frame, not illustrated in the drawing, to be free to rotate via a steering column 3 such that one end thereof extends to a driving seat side and another end extends to an engine room side. A steering wheel 4 is fixed to the driving seat side end of the steering shaft 2, and a pinion shaft 5 is connected to the end of the steering shaft 2 that extends to the engine room side.

A steering gearbox 6 that extends in a vehicle width direction is disposed in the engine room, and a rack shaft 7 is inserted into and supported by the steering gearbox 6 so as to be free to reciprocate. A pinion formed on the pinion shaft 5 meshes with a rack (not illustrated) formed on the rack shaft 7, and as a result, a rack and pinion type steering gear mechanism is formed.

Further, left-right ends of the rack shaft 7 project from respective ends of the steering gearbox 6, and front knuckles 9 are connected to the respective ends via a die rod 8. The front knuckles 9 support left and right wheels 10L, 10R serving as steered wheels to be free to rotate, and are supported steerably on the vehicle body frame. Hence, when the steering wheel 4 is operated such that the steering shaft 2 and the pinion shaft 5 rotate, the rack shaft 7 moves in a left-right direction in response to the rotation of the pinion shaft 5, and in response to this movement, the front knuckles 9 rotate about kingpin shafts (not illustrated) such that the left and right wheels 10L, 10R are steered in the left-right direction.

Furthermore, an electric power steering motor (an electric motor) 12 is connected to the pinion shaft 5 via an assist transmission mechanism 11, and the electric motor 12 is configured to assist steering torque applied to the steering wheel 4, and to apply steering torque in order to realize a set target steering angle. The electric motor 12 is driven by a motor driver 21 by outputting a target torque Tt to the motor driver 21 from a steering controller 20, to be described below, as a control output value.

The steering controller 20 is configured to include an electric power steering control function for assisting a steering force generated by the driver, a lane keep control function for ensuring that the vehicle travels along a target traveling route, a lane deviation prevention control function for preventing the vehicle from crossing a lane division line, and so on.

The steering controller 20 according to this implementation performs two types of lane keep control as the lane keep control, namely lane keep control executed in a case where lane division lines can be recognized by a frontward recognition device such as a camera, not illustrated in the drawing, and lane keep control executed in a case where lane division lines cannot be recognized by the camera or other frontward recognition device.

In the lane keep control executed when lane division lines can be recognized by the frontward recognition device, lane keep control is executed by, for example, setting the target traveling route in the center of the recognized lane and ensuring that the vehicle travels along the target traveling route.

Further, in the lane keep control executed when lane division lines cannot be recognized by the frontward recognition device, traveling road information relating to a traveling road of the vehicle is obtained on the basis of map information and position information indicating a position of the vehicle, the target traveling route of the vehicle is set on the basis of the traveling road information of the vehicle, an traveling route of the vehicle is estimated on the basis of motion information relating to the vehicle, and control is performed so as to reduce a deviation between the target traveling route of the vehicle and the estimated traveling route of the vehicle on the basis of this deviation.

A navigation system 31, a vehicle speed sensor 32, a yaw rate sensor 33, and a steering torque sensor 34 are connected to the steering controller 20 to enable the steering controller 20 to perform lane keep control even when lane division lines cannot be recognized by the frontward recognition device.

The navigation system 31 is a conventional system that, for example, obtains position information (latitude and longitude) indicating the position of the vehicle by receiving radio wave signals from a GPS (Global Positioning System) satellite, obtains a vehicle speed V from the vehicle speed sensor 32, and obtains movement direction information from a geomagnetic sensor, a gyro sensor, or the like. The navigation system 31 is configured to include a navigation ECU that generates route information used to realize a navigation function, a map database storing map information, and a display such as a liquid crystal display, for example (none of which are illustrated in the drawings).

Figure 4:
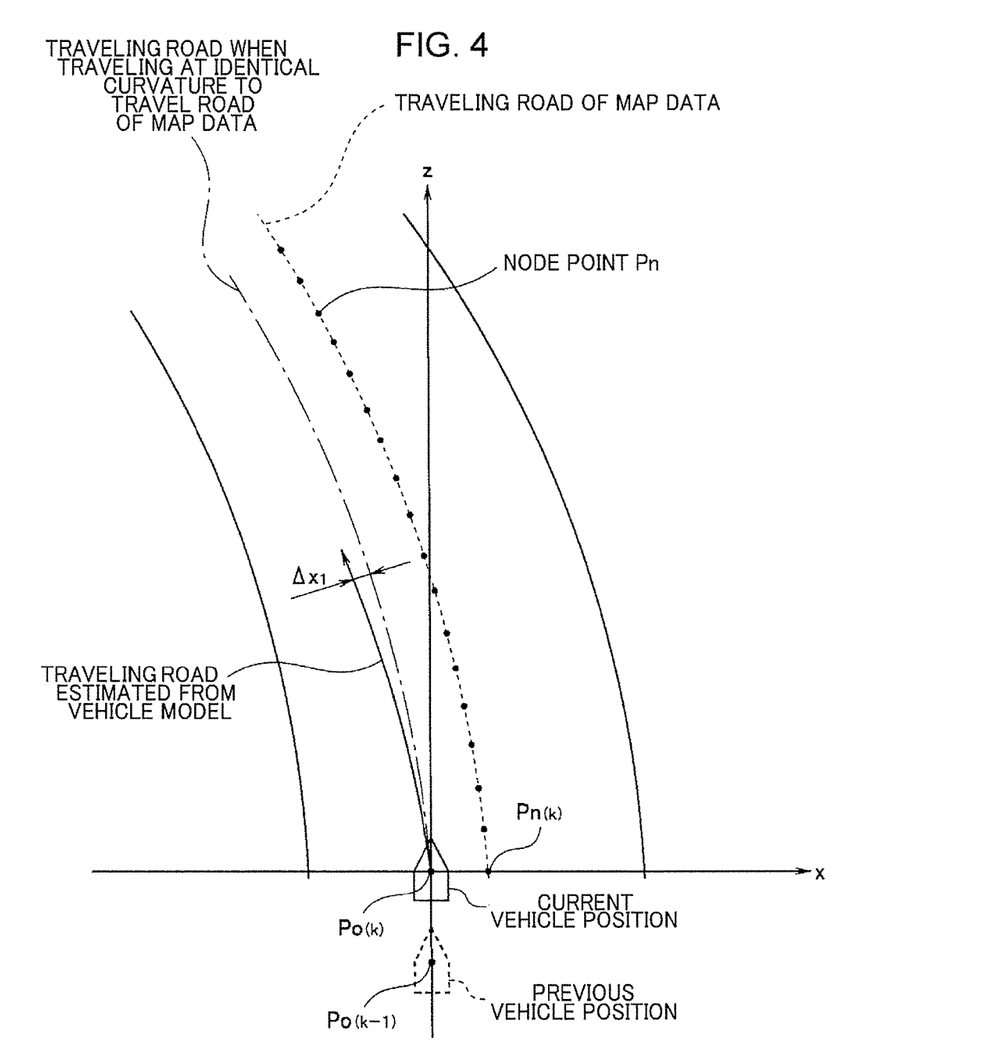
FIG. 4 is illustrates a lateral deviation occurring during travel on a curve, according to this implementation of the present invention.
Figure 5:
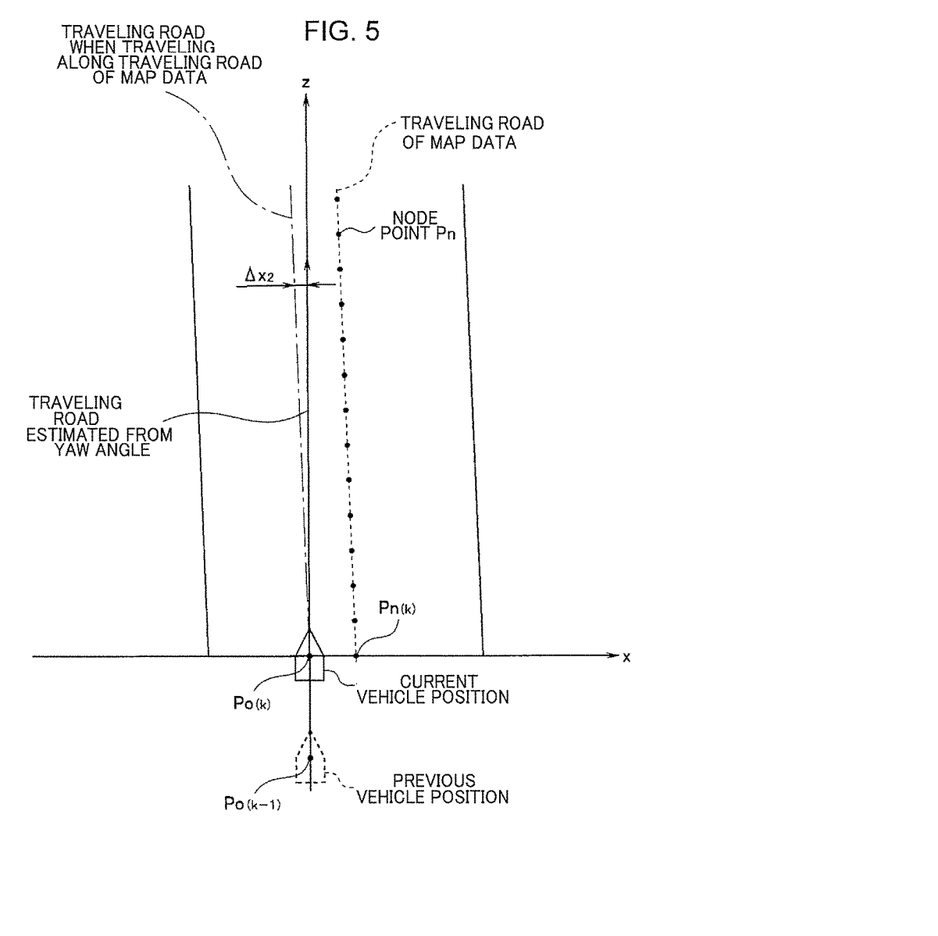
FIG. 5 illustrates a lateral deviation occurring during travel on a straight road, according to this implementation of the present invention.

The navigation ECU displays route information to a destination specified by a user so as to be superimposed on a map image displayed on the display, and displays the current position of the vehicle so as to be superimposed on the map image displayed on the display on the basis of information indicating the detected position, speed, travel direction, and so on of the vehicle. Further, the map database stores information required to construct a road map, such as node data and facility data. The node data relate to positions and shapes of roads constituting the map image, and include, for example, data indicating coordinates (latitudes and longitudes) of points (node points Pn) on roads that include bifurcation points (intersections), directions and classifications (information indicating expressways, trunk roads, and urban roads, for example) of the roads that include the node points Pn, as well as road types (straight sections, arc sections (arc-shaped curves), and clothoid curve sections (gentle curves)) and curve curvatures κ (or radii) at the node points Pn. Hence, as shown in FIG. 4 or FIG. 5, the traveling road of the vehicle is specified from the map position in which the current position of the vehicle is superimposed, and traveling road information such as the curve curvature κ (or the radius) of the road and the direction of the road is obtained from information indicating a node point Pn(k) that is closest to a position Po(k) of the vehicle using the traveling road of the vehicle as the target traveling route. Furthermore, the facility data include data relating to facilities existing in the vicinity of the respective node points Pn, and are stored in association with the node data (or link data indicating links on which the nodes exist). In one implementation, the navigation system 31 may be provided as a "map information storage unit", a "vehicle position information obtaining unit", a "traveling road information obtaining unit", and a "target traveling route setting unit".

When lane division lines cannot be recognized by the frontward recognition device, the steering controller 20 executes lane keep control on the basis of the data from the navigation system 31 and respective input values of the vehicle speed V from the vehicle speed sensor 32, a yaw rate γ from the yaw rate sensor 33, and a steering torque Tdrv from the steering torque sensor 34.

Figure 2:
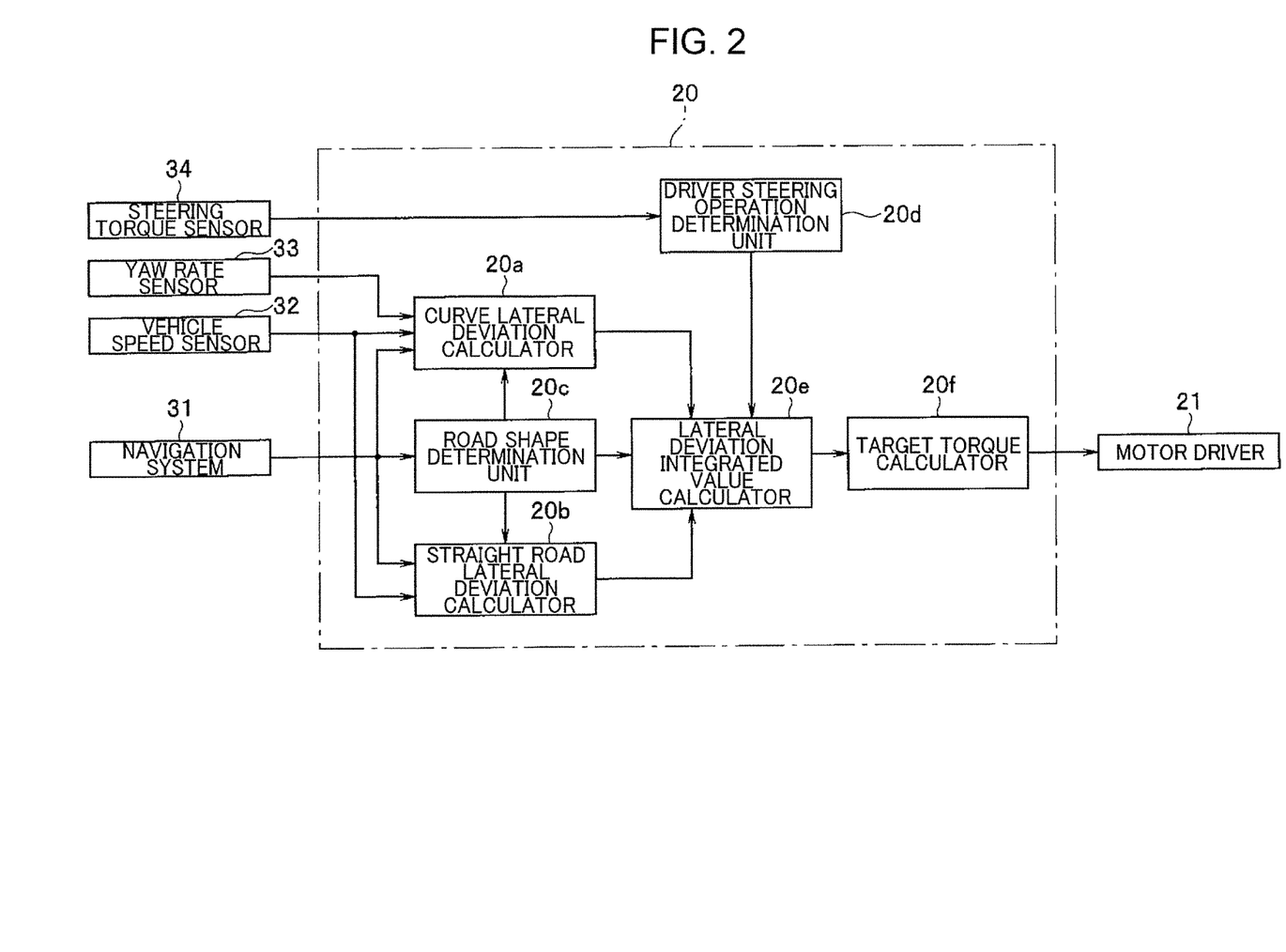
FIG. 2 is a block diagram illustrating functions of a steering controller according to this implementation of the present invention.

For this purpose, as shown in FIG. 2, the steering controller 20 is configured to include a curve lateral deviation calculator 20a, a straight road lateral deviation calculator 20b, a road shape determination unit 20c, a driver steering operation determination unit 20d, a lateral deviation integrated value calculator 20e, and a target torque calculator 20f.

The curve curvature κ of the traveling road (the target traveling route) of the vehicle is input into the curve lateral deviation calculator 20a from the navigation system 31 in accordance with the information indicating the node point Pn(k) closest to the position Po(k) of the vehicle. Further, the vehicle speed V and the yaw rate γ are input into the curve lateral deviation calculator 20a from the vehicle speed sensor 32 and the yaw rate sensor 33, respectively. Next, as shown in FIG. 4, for example, the curve lateral deviation calculator 20a calculates a curve lateral deviation $\Delta x_1$ using Equation (1), illustrated below, and outputs the calculated curve lateral deviation $\Delta x_1$ to the lateral deviation integrated value calculator 20e.

$$\Delta x_1 = \kappa - (\gamma/V) \quad (1)$$

Here, the operand γ/V in Equation (1) is an operand of the curve curvature on a vehicle motion model.

The direction of the traveling road (the target traveling route) of the vehicle and the movement direction of the vehicle are input into the straight road lateral deviation calculator 20b from the navigation system 31 in accordance with the information indicating the node point Pn(k) closest to the position Po(k) of the vehicle. Further, the vehicle speed V is input into the straight road lateral deviation calculator 20b from the vehicle speed sensor 32. Next, as shown in FIG. 5, for example, the straight road lateral deviation calculator 20b calculates a straight road lateral deviation $\Delta x_2$ using Equation (2), illustrated below, and outputs the calculated straight road lateral deviation $\Delta x_2$ to the lateral deviation integrated value calculator 20e.

$$\Delta x_2 = ((\text{direction of traveling road of vehicle}) - (\text{movement direction of vehicle})) \times V \times \Delta t \quad (2)$$

Here, $\Delta t$ is a sampling time. In one implementation, the curve lateral deviation calculator 20a and the straight road lateral deviation calculator 20b may serve as a "target traveling route setting unit" and a "vehicle traveling route estimating unit".

The curve curvature κ of the traveling road (the target traveling route) of the vehicle is input into the road shape determination unit 20c from the navigation system 31 in accordance with the information indicating the node point Pn(k) closest to the position Po(k) of the vehicle. The road shape determination unit 20c then compares the curve curvature κ of the traveling road of the vehicle with a determination value κc set in advance by experiment, calculation, and so on, and when the curve curvature κ of the traveling road of the vehicle equals or exceeds the determination value κc, determines that the vehicle is traveling on a curve. Conversely, when the curve curvature κ of the traveling road of the vehicle is smaller than the determination value κc, the road shape determination unit 20c determines that the vehicle is traveling on a straight road. The road shape determination result is output to the curve lateral deviation calculator 20a, the straight road lateral deviation calculator 20b, and the lateral deviation integrated value calculator 20e. Note that when the road shape determination result is included in the information indicating the node point Pn(k) from the navigation system 31, this result may be used.

The steering torque Tdrv is input into the driver steering operation determination unit 20d from the steering torque sensor 34. The driver steering operation determination unit 20d then compares the steering torque Tdrv with a torque determination value Tc set in advance by experiment, calculation, and so on, and when the steering torque Tdrv equals or exceeds the torque determination value Tc, determines that a steering operation has been input by the driver. Conversely, when the steering torque Tdrv is smaller than the torque determination value Tc, the driver steering operation determination unit 20d determines that a steering operation has not been input by the driver. The determination result relating to a steering operation input by the driver is then output to the lateral deviation integrated value calculator 20e.

The curve lateral deviation $\Delta x_1$, the straight road lateral deviation $\Delta x_2$, the road shape determination result (whether the road is a curve or a straight road), and the determination result relating to a steering operation input by the driver are input into the lateral deviation integrated value calculator 20e from the curve lateral deviation calculator 20a, the straight road lateral deviation calculator 20b, the road shape determination unit 20c, and the driver steering operation determination unit 20d, respectively. When the vehicle is traveling on a curve, the lateral deviation integrated value calculator 20e integrates the curve lateral deviation $\Delta x_1$ with a previous lateral deviation integrated value $S\Delta x$ ($S\Delta x = S\Delta x + \Delta x_1$), and when the vehicle is traveling on a straight road, the lateral deviation integrated value calculator 20e integrates the straight road lateral deviation $\Delta x_2$ with the previous lateral deviation integrated value $S\Delta x$ ($S\Delta x = S\Delta x + \Delta x_2$). The lateral deviation integrated value $S\Delta x$ is then output to the target torque calculator 20f. When, at this time, a steering operation has been input by the driver, the lateral deviation integrated value $S\Delta x$ is reset ($S\Delta x = 0$) in order to set the lateral position on the traveling road set by the driver steering operation as a control position on the traveling road.

The lateral deviation integrated value $S\Delta x$ is input into the target torque calculator 20f from the lateral deviation integrated value calculator 20e. The target torque calculator 20f then calculates the target torque Tt using Equation (3) illustrated below, for example, and outputs the calculated target torque Tt to the motor driver 21.

$$Tt = Gt \times S\Delta x \quad (3)$$

Here, Gt is a control gain set in advance by experiment, calculation, and so on. In one implementation, the road shape determination unit 20c, the driver steering operation determination unit 20d, the lateral deviation integrated value calculator 20e, and the target torque calculator 20f may be provided as a "controller".

Figure 3:
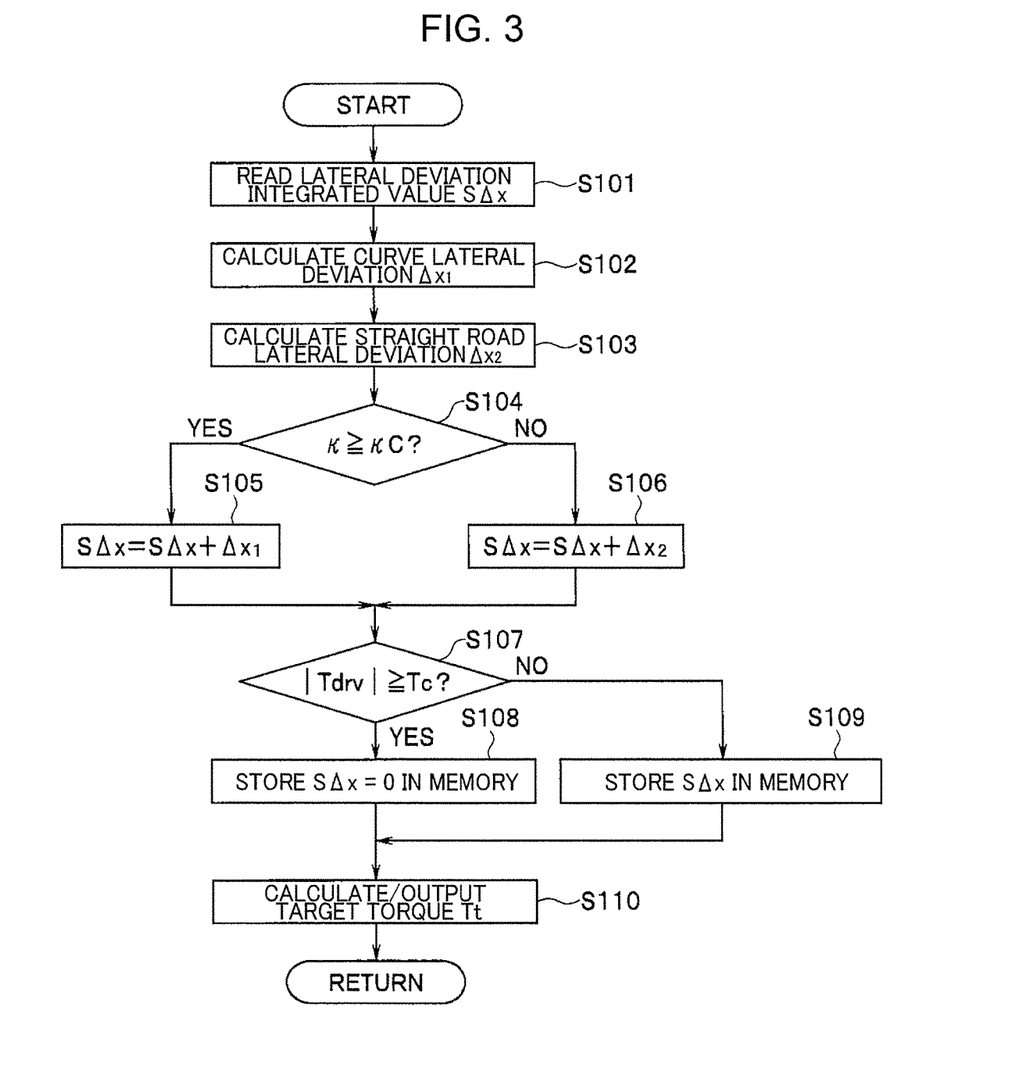
FIG. 3 is a flowchart illustrating a lane keep control program according to this implementation of the present invention.

Next, the lane keep control executed by the steering controller 20 in a case where lane division lines cannot be recognized by the frontward recognition device will be described using a flowchart illustrated in FIG. 3.

First, in step (abbreviated to "S" hereafter) 101, the lateral deviation integrated value calculator 20e reads the currently set lateral deviation integrated value $S\Delta x$.

Next, the program advances to S102, where the curve lateral deviation calculator 20a calculates the curve lateral deviation $\Delta x_1$ using Equation (1), for example.

Next, the program advances to S103, where the straight road lateral deviation calculator 20b calculates the straight road lateral deviation $\Delta x_2$ using Equation (2), for example.

Next, the program advances to S104, where the road shape determination unit 20c compares the curve curvature κ of the traveling road of the vehicle with the determination value κc set in advance by experiment, calculation, and so on, and when the curve curvature κ of the traveling road of the vehicle equals or exceeds the determination value κc (when κ≥κc), determines that the vehicle is traveling on a curve. In this case, the program advances to S105, where the lateral deviation integrated value calculator 20e integrates the curve lateral deviation $\Delta x_1$ with the previous lateral deviation integrated value $S\Delta x$ ($S\Delta x = S\Delta x + \Delta x_1$).

When the curve curvature κ of the traveling road of the vehicle is smaller than the determination value κc (when κ<κc), on the other hand, the road shape determination unit 20c determines that the vehicle is traveling on a straight road. In this case, the program advances to S106, where the lateral deviation integrated value calculator 20e integrates the straight road lateral deviation $\Delta x_2$ with the previous lateral deviation integrated value $S\Delta x$ ($S\Delta x = S\Delta x + \Delta x_2$).

After the lateral deviation integrated value $S\Delta x$ is calculated in S105 or S106, the program advances to S107, where the driver steering operation determination unit 20d determines whether a steering torque absolute value |Tdrv| equals or exceeds the torque determination value Tc set in advance by experiment, calculation, and so on (i.e. whether |Tdrv|≥Tc) so as to examine whether a steering operation has been input by the driver.

When it is found as a result of the determination of S107 that |Tdrv|≥Tc, indicating that a steering operation has been input by the driver, the program advances to S108, where the lateral deviation integrated value calculator 20e clears the lateral deviation integrated value $S\Delta x$ ($S\Delta x = 0$) and then stores the cleared lateral deviation integrated value $S\Delta x$ in a memory. Conversely, when |Tdrv|<Tc, indicating that a steering operation has not been input by the driver, the program advances to S109, where the lateral deviation integrated value calculator 20e stores the lateral deviation integrated value SΔx in a memory as is.

The program then advances to S110, where the target torque calculator 20f calculates the target torque Tt using Equation (3), for example, and outputs the calculated target torque Tt to the motor driver 21. The program is then terminated.

Hence, according to this implementation, the traveling road information of the vehicle is obtained on the basis of the map information and the position information of the vehicle, the target traveling route of the vehicle is set on the basis of the traveling road information of the vehicle, the traveling route of the vehicle is estimated on the basis of the motion information of the vehicle, and control is performed so as to reduce the deviation between the target traveling route of the vehicle and the estimated traveling route of the vehicle on the basis of this deviation. Accordingly, lane keep control can be performed with a high degree of precision on the basis of the map information and the vehicle position information even when lane division lines cannot be recognized by the camera or other frontward recognition device, and as a result, highly reliable lane keep control can be realized. Note that in this implementation, a configuration in which the steering controller 20 performs two types of lane keep control, namely the lane keep control executed in a case where lane division lines can be recognized by the camera or other frontward recognition device and the lane keep control executed in a case where lane division lines cannot be recognized by the camera or other frontward recognition device, as the lane keep control was described, but instead, the steering controller 20 may of course be employed as a lane keep control apparatus for a vehicle that includes the navigation system 31 described above but does not include a frontward recognition device.

The invention claimed is:

1. A travel control apparatus for a vehicle, the travel control apparatus comprising:
   a map information storage unit that stores map information;
   a vehicle position information obtaining unit that obtains position information indicating a position of the vehicle;
   a traveling road information obtaining unit that obtains traveling road information relating to a traveling road of the vehicle on the basis of the map information and the position information of the vehicle;
   a target traveling route setting unit that sets a target traveling route of the vehicle on the basis of the traveling road information of the vehicle;
   a vehicle traveling route estimating unit that estimates an traveling route of the vehicle on the basis of motion information relating to the vehicle; and
   a controller that performs control so as to reduce a deviation between the target traveling route of the vehicle and the estimated traveling route of the vehicle on the basis of the deviation,
   wherein the controller resets the deviation between the target traveling route of the vehicle and the estimated traveling route of the vehicle when a steering operation of at least a preset value is input by a driver.

2. The travel control apparatus for a vehicle according to claim 1, wherein, when the traveling road information obtaining unit determines that the vehicle is traveling on a curve, the target traveling route setting unit obtains a curvature of the target traveling route of the vehicle on the basis of the traveling road information of the vehicle, the vehicle traveling route estimating unit calculates a curvature of the estimated traveling route of the vehicle using a vehicle motion model, and the controller performs control so as to reduce a deviation between values of the respective curvatures.

3. The travel control apparatus for a vehicle according to claim 2, wherein, when the traveling road information obtaining unit determines that the vehicle is traveling on a substantially straight road, the target traveling route setting unit obtains a direction of the target traveling route of the vehicle on the basis of the traveling road information of the vehicle, the vehicle traveling route estimating unit obtains a movement direction of the vehicle from the vehicle position information obtaining unit, and the controller performs control so as to reduce a deviation between values of the respective directions.

4. The travel control apparatus for a vehicle according to claim 1, wherein, when the traveling road information obtaining unit determines that the vehicle is traveling on a substantially straight road, the target traveling route setting unit obtains a direction of the target traveling route of the vehicle on the basis of the traveling road information of the vehicle, the vehicle traveling route estimating unit obtains a movement direction of the vehicle from the vehicle position information obtaining unit, and the controller performs control so as to reduce a deviation between values of the respective directions.

* * * * *